Sept. 19, 1950  R. M. JOHNSON  2,522,578
RECOVERY OF CRAB MEAT
Filed Aug. 9, 1946  3 Sheets-Sheet 2
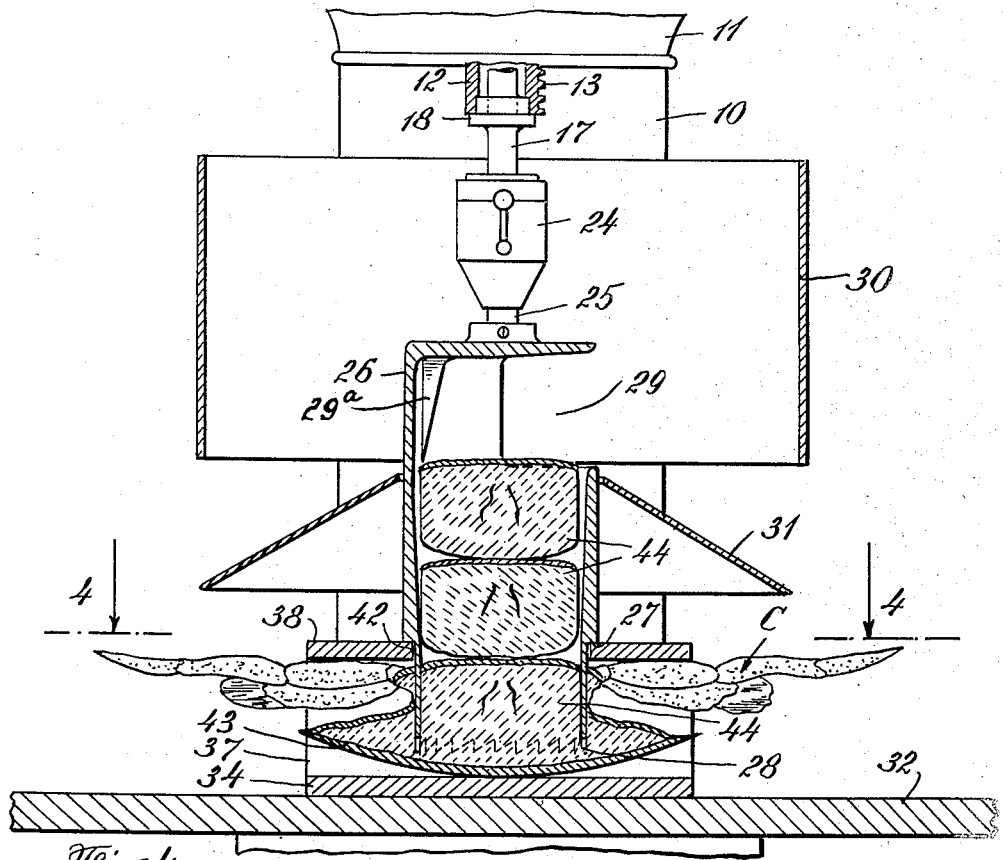
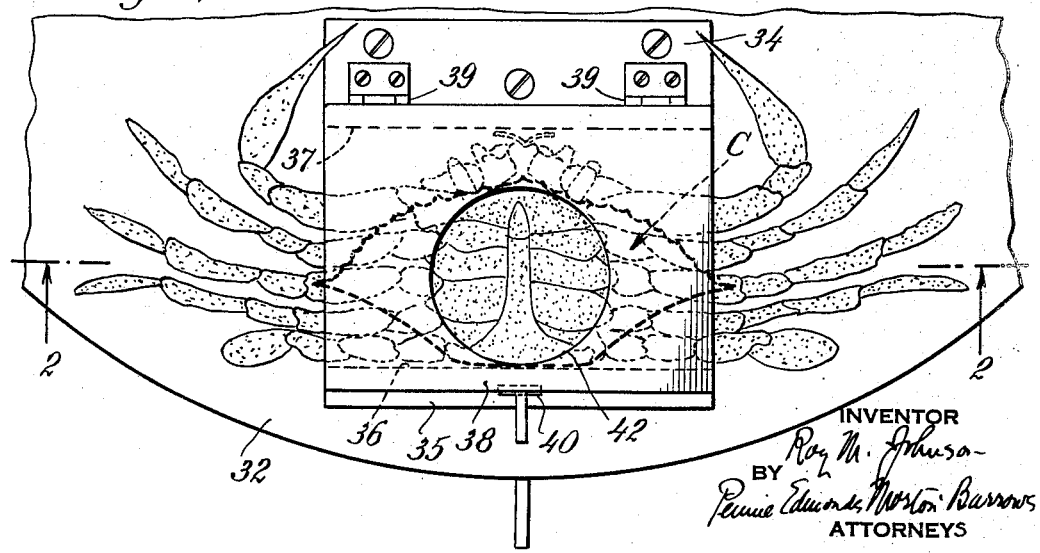
INVENTOR
Roy M. Johnson
BY
Pennie Edmonds Morton Barrows
ATTORNEYS

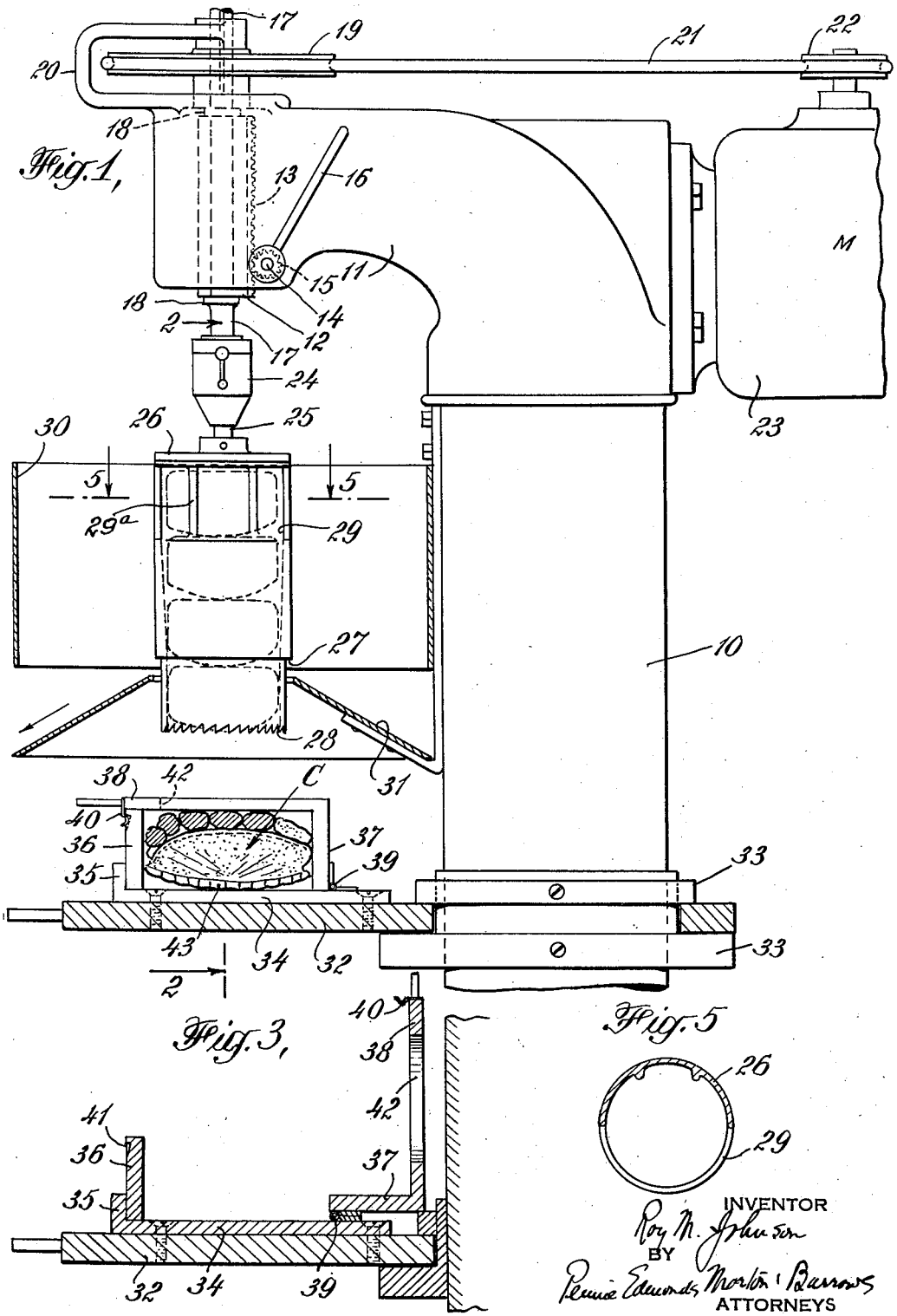

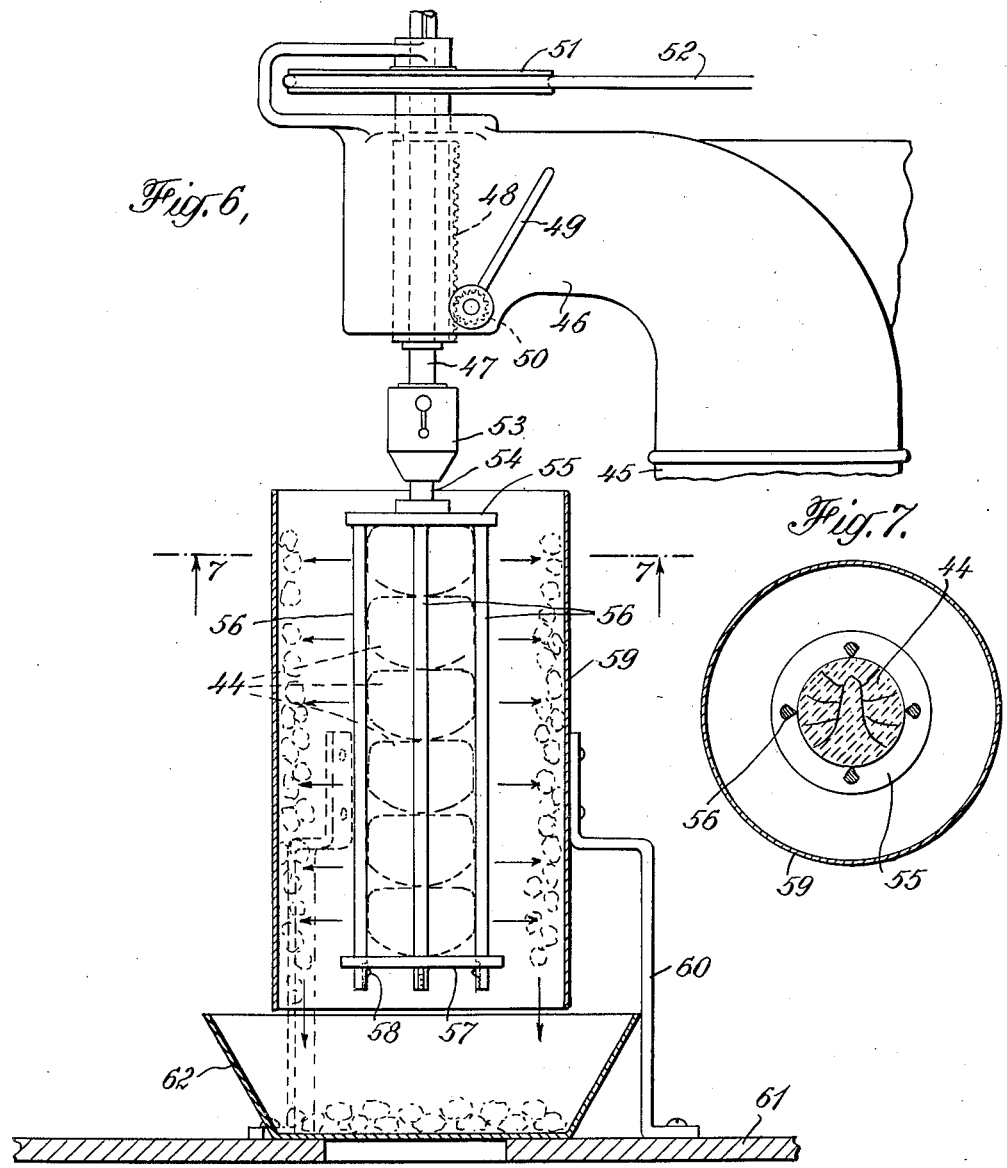

Patented Sept. 19, 1950

2,522,578

UNITED STATES PATENT OFFICE 2,522,578

RECOVERY OF CRAB MEAT

Roy M. Johnson, Beaufort, S. C., assignor to The Blue Channel Corporation, Port Royal, S. C., a corporation of Maryland Application August 9, 1946, Serial No. 689,540

6 Claims. (Cl. 17—45)

This invention relates to the recovery of the meat from crabs, such as the common edible crabs of the Atlantic coast of the United States, which are the so-called "blue," "rock," and "sand" crabs. More particularly, the invention is concerned with a novel method, by which the meat of crabs of the types mentioned may be readily removed from the shell as a preliminary to canning.

The canning of crab meat involves a considerable business risk, because the meat is extremely perishable in that it rapidly becomes discolored to the point where it is unmarketable. It is, therefore, of the utmost importance that the operations incident to canning crab meat be carried on with as great speed as possible. The recovery of the meat from a crab is a difficult operation, because the interior of its carcass is subdivided by thin irregular partitions into many compartments, some of which contain the meat, while the others contain the viscera. Heretofore, the meat has been removed from the crab by manual picking operations and the work is relatively slow, so that the daily output of a picker is small and the labor charge for picking is an important item in the cost of production.

As a result of investigation, I have found that substantially all the body meat in a crab can be recovered by removal from the carcass of a cylindrical core extending inwardly from the ventral side and terminating at the under surface of the carapace. Such a core should have a diameter such that it lies just within the knuckles of the legs and claws and it can be readily cut free and removed by suitable means, such as a trepanning tool operated at high speed. The core referred to extends into the main visceral cavity directly beneath the carapace and includes a part of the main longitudinal partition within the body and portions of lateral partitions. As these partitions are cut through, the portions of the partitions within the core become detached from the carapace and the core starts to rotate with the tool. This causes a churning and disintegration of the viscera into a watery pulp and, when the tool is retracted, the core moves with it and the visceral pulp is left behind.

In a core so produced, the meat lies in compartments separated by skeletal parts, but the compartments are open at the circumference of the core. Accordingly, upon rotation of the core at high speed on its axis, the meat can be thrown free of the compartments by centrifugal force.

In carrying out the new method of recovering crab meat, the crabs are first preferably subjected to a preliminary heat treatment, as described in Harris Patent 2,155,308, and a generally cylindrical cut is made in each crab, the cut extending inwardly from the ventral surface. The cut extends to the under surface of the carapace and the core defined by the cut is rotated rapidly upon its axis toward or after the end of the cutting operation to cause the reduction of the viscera to pulp. The core is then removed and rotated rapidly on its axis to discharge the meat, which can then be subjected to the usual additional treatments.

For a better understanding of the invention, reference may be had to the accompanying drawings, in which:

Fig. 1 is a view in elevation, with parts in section, of an apparatus for practicing one step of the new method;

Fig. 2 is a vertical sectional view on the lines 2—2 of Figs. 1 and 4 but with the cutting tool shown in lowered position;

Fig. 3 is a vertical sectional view of the crab holding means employed in the apparatus;

Fig. 4 is a sectional view on the line 4—4 of Fig. 2;

Fig. 5 is a sectional view on the line 5—5 of Fig. 1;

Fig. 6 is a view in vertical elevation, with parts shown in section, of apparatus for practicing another step in the new method; and Fig. 7 is a sectional view on the line 7—7 of Fig. 6.

The apparatus illustrated comprises a standard 10 mounted on a suitable supporting surface and carrying a horizontally extending arm 11 at its upper end. A vertical sleeve 12 is mounted for vertical movement near the outer end of arm 11 and is provided with a rack 13. A stub shaft 14 is supported on the arm and carries a pinion 15 which meshes with the rack. A handle 16 is attached to shaft 14 and provides means by which pinion 15 may be rotated to raise and lower the sleeve. A shaft 17 extends through the sleeve and is provided with collars 18 at the ends of the sleeve, so that the shaft is raised and lowered with the sleeve. The shaft extends out of arm 11 and through a pulley 19 which lies between the top of the arm and the end of a bracket 20. The shaft is keyed to the pulley in such manner that the shaft may move freely through the pulley but is held against angular rotation relative thereto. Pulley 19 is driven by a belt 21 from a pulley 22 on the shaft of a motor 23 secured to arm 11 near the standard 10.

On its lower end, the shaft 17 carries a chuck 24 of any suitable type and the stem 25 of a trepanning tool 26 is held in the jaws of the chuck. The tool is of hollow cylindrical form and of considerable length. Its internal diameter increases upwardly from its lower end and its outer diameter increases abruptly at the shoulder 27. The lower edge of the tool is formed with cutting teeth 28 and, near its upper end, the wall of the tool is cut away to form an opening 29, which extends half way around the tool. Opposite the opening, the inner surface of the tool is provided with one or more ribs 29a. A cylindrical shield 30 mounted on the standard 10 surrounds the tool 26 and a collector 31 of frusto-conical form is attached to standard 10 below the end of the shield.

A turn table 32 is mounted on standard 10 between upper and lower collars 33 and can be swung to and from a position beneath the tool. The turn table carries a crab holder, which comprises a plate 34 having a vertical flange 35, to which is secured a vertical plate 36. The holder is completed by a vertical plate 37 and a cover plate 38 extending at right angles to one another, plate 37 being secured to plate 34 by a hinge 39. The cover plate can be swung from the position shown in Fig. 3 to that shown in Fig. 1 and, in the latter position, it rests on top of plate 36 and is held in place thereon by a spring 40 attached to the cover plate and having an offset which enters a notch 41 in plate 36. The cover plate 38 has a circular opening 42 through which the cutting end of tool 26 may pass and the space defined by plates 34, 36, 37, and 38, when the cover is in closed position, is sufficient to receive a crab with a fairly close fit.

In the operation of the apparatus described, a crab, C, which has been given a preliminary heating treatment, such as that described in Harris Patent 2,155,308, is placed within the holder on the turn table with its ventral side uppermost and its legs and claws extending out at either end of the holder. The cover plate 38 of the holder is lowered to closed position and the turn table is swung to place the opening 42 in the cover plate beneath the trepanning tool. The motor is then started and, with the tool rotating at high speed, of the order of 7000 R. P. M., the handle 16 is rotated to lower sleeve 12, shaft 17, and the tool. The tool cuts through the ventral shell and through the partitions and meat within the body of the crab, until the tool reaches the inner surface of the carapace 43. The main visceral cavity lies just beneath the carapace and, at about the time the annular cut has been completed, the core 44, defined by the cut, begins to rotate with the tool and this causes the viscera to be disintegrated and reduced to a watery pulp which does not adhere to the core.

Upon completion of the operations above described, the tool is reused with the core inside it, the carcass of the crab is removed from the holder, and a new crab is inserted. The operations of removing a core from the crab are then repeated, and, as the second core enters the tool, it forces the one first cut upwardly through the tool. After a number of cores have been cut, the insertion of another core into the tool causes the core first cut to be moved into alignment with the opening 29 through the tool and to be moved toward the opening by ribs 29a. The opening is of sufficient size to permit the core to be thrown therethrough by centrifugal force, and, as the tool rotates, the core is ejected, strikes the shield 30, and drops down on the collar 31, whence it can be removed for the second stage in the operation.

The apparatus for carrying on the second operation in the method includes a standard 45 terminating at its upper end in an arm 46 in which is mounted a shaft 47. The shaft extends through a sleeve 48 which can be raised and lowered by a handle 49 on a stub shaft carrying a pinion 50 meshing with a rack or sleeve 48. Shaft 47 is driven by a pulley 51 rotated by a belt 52 driven by the pulley of a motor (not shown). At its lower end, shaft 47 carries a chuck 53, in the jaws of which are mounted the stem 54 of a cage. The cage comprises an upper disc 55, a plurality of vertical bars 56, and a lower disc 57, which has openings through which the ends of the bars 56 may be inserted, disc 57 then being held in place by spring latches 58 carried by the lower ends of the bars. The bars, as shown in Fig. 7, are wedge-shaped in section and their sharp edges point toward the center of rotation of the cage. The cage lies within a cylindrical shield 59 supported on standards 60 on a table 61 and the shield is spaced from the surface of the table, so that a pan 62 may be inserted below the end of the shield and cage.

Each core 44 produced by the trepanning operation previously described includes a portion of the ventral shell of a crab and portions of the internal partitions, which define compartments within the crab body. The meat lies within these compartments and the compartments are open at the circumference of the core. In order to remove the meat, the cores are rotated at high speed on their axes and, for this purpose, the lower disc 57 of the cage is removed and cores are inserted into the space defined by bars 56. The cores are placed one above the other and, when the cage is filled, the lower disc 57 is placed in position. The cage is then rotated at high speed, such as 5000 to 7000 R. P. M., and the meat is then thrown out by centrifugal force from the cores, strikes the inner surface of the shell 59, and drops down into the pan 62. By forming the bars 56 with knife edges as described, the orientation of the cores within the cage is unimportant and, if a core is placed in position with meat opposite one of the bars, the presence of the bar will not prevent the meat from being thrown free, since the meat will be divided by the knife edge of the bar. At the conclusion of the spinning operation, the lower disc of the cage is removed and the empty cores discharged. Another group of cores is then loaded in place and the operations repeated.

By the practice of the new method, the meat can be recovered from the crabs rapidly and effectively. The cutting of a core from a crab by the apparatus shown in Fig. 1 takes only a few seconds, since the tool rotating at high speed encounters little resistance in the cutting operation and can be lowered rapidly into the crab. The ejection of the cores from the tool is automatic and, if desired, the turn table 32 may be provided with a number of holders, so that while the crab in one holder is being cored, another holder may be loaded. The removal of the meat from the cores by centrifugal action is highly effective and a spinning operation of only short duration is required for the purpose. The meat recovered is substantially free of bone and shell and is ready for the subsequent dipping and other operations incidental to canning.

The diameter of the cutting tool should be such that the annular cut lies just within the knuckles of the crab, in order that the maximum amount of meat will be contained in the cores. While crabs vary somewhat in their dimensions, cutting tools of two different diameters are ordinarily sufficient for the purpose and a single spinning cage is satisfactory for the handling of cores from crabs of the different sizes that are ordinarily encountered.

I claim:

1. A method of recovering the body meat from crabs, which comprises making a circular cut through the ventral surface of the crab body and through the meat and skeletal parts within the body, the cut terminating substantially at the under surface of the carapace and defining a generally cylindrical core, rotating the core upon its axis, while it remains otherwise in place to disintegrate the viscera within the core at its end remote from said ventral surface, removing the core from the remainder of the body, and rotating the core upon its axis to throw the meat therefrom by centrifugal action.

2. A method of recovering the body meat from crabs, which comprises trepanning through the ventral surface of the crab and through the meat and skeletal parts within the body to produce a core, the trepanning cut extending into the main visceral cavity, rotating the core upon its axis, while it remains otherwise in place to disintegrate the viscera within the core at its end remote from said ventral surface, removing the core from the remainder of the body, and rotating the core upon its axis to throw the meat therefrom by centrifugal action.

3. A method of recovering the body meat from crabs, which comprises making a circular cut through the ventral surface of the crab body and through the meat and skeletal parts within the body, the cut terminating substantially at the under surface of the carapace and defining a generally cylindrical core, rotating the core upon its axis, while it remains otherwise in place to disintegrate the viscera within the core at its end remote from said ventral surface, removing the core from the remainder of the body, confining the core along lines along its outer surface and extending lengthwise thereof, and rotating the core so confined upon its axis to discharge the meat therefrom centrifugally.

4. A method of recovering the body meat from crabs, which comprises making a circular cut through the ventral surface of the crab body and through the meat and skeletal parts within the body, the cut terminating substantially at the under surface of the carapace and defining a generally cylindrical core, rotating the core upon its axis, while it remains otherwise in place to disintegrate the viscera within the core at its end remote from said ventral surface, removing the core from the remainder of the body, supporting a plurality of cores in axial alignment, and rotating the cores on their common axis to discharge the meat therefrom centrifugally.

5. In a method of recovering the body meat from crabs, the steps of making a circular cut through the ventral surface of the crab body and through the meat and skeletal parts within the body, the cut terminating close to the inner surface of the carapace of the crab and defining a generally cylindrical core lying within the knuckles of the crab, rotating the core upon its axis, while it remains otherwise in place, to disintegrate the viscera within the core adjacent the carapace, and removing the core from the remainder of the body.

6. A method of recovering the body meat from crabs, which comprises making a circular cut through the ventral surface of the crab body and through the meat and skeletal parts within the body, the cut terminating substantially at the under surface of the carapace and defining a generally cylindrical core, rotating the core upon its axis, while it remains otherwise in place, removing the core from the body, supporting a group of cores in a row in coaxial relation, while confining the cores at spaced points along their peripheries, and rotating the group of cores upon their common axis to throw the meat therefrom by centrifugal action.

ROY M. JOHNSON.

REFERENCES CITED

The following references are of record in the file of this patent:

UNITED STATES PATENTS

| Number | Name | Date |
|---|---|---|
| 1,722,450 | Barry | July 30, 1929 |
| 2,104,027 | Dubus | Jan. 4, 1938 |
| 2,335,806 | Sjostrom | Nov. 30, 1943 |